United States Patent
Boshra

(10) Patent No.: US 7,787,667 B2
(45) Date of Patent: Aug. 31, 2010

(54) SPOT-BASED FINGER BIOMETRIC PROCESSING METHOD AND ASSOCIATED SENSOR

(75) Inventor: Michael Boshra, Indialantic, FL (US)

(73) Assignee: Authentec, Inc., Melbourne, FL (US)

( * ) Notice: Subject to any disclaimer, the term of this patent is extended or adjusted under 35 U.S.C. 154(b) by 1177 days.

(21) Appl. No.: 10/957,331

(22) Filed: Oct. 1, 2004

(65) Prior Publication Data

US 2005/0100199 A1    May 12, 2005

Related U.S. Application Data

(60) Provisional application No. 60/507,788, filed on Oct. 1, 2003.

(51) Int. Cl.
    *G06K 9/00* (2006.01)
(52) U.S. Cl. .................................................. 382/124
(58) Field of Classification Search .................. 382/124, 382/125
    See application file for complete search history.

(56) References Cited

U.S. PATENT DOCUMENTS

| | | | | |
|---|---|---|---|---|
| 4,792,226 | A | * | 12/1988 | Fishbine et al. ............... 356/71 |
| 5,067,162 | A | * | 11/1991 | Driscoll et al. ............... 382/126 |
| 5,325,442 | A | | 6/1994 | Knapp ............................ 382/4 |
| 5,351,303 | A | | 9/1994 | Willmore ....................... 382/2 |
| 5,613,014 | A | * | 3/1997 | Eshera et al. ................ 382/124 |
| 5,689,576 | A | | 11/1997 | Schneider et al. ........... 382/124 |
| 5,737,439 | A | | 4/1998 | Lapsley et al. ............... 382/115 |
| 5,909,501 | A | * | 6/1999 | Thebaud ...................... 382/124 |
| 5,940,526 | A | | 8/1999 | Setlak et al. ................. 382/124 |
| 5,953,441 | A | | 9/1999 | Setlak ......................... 382/124 |
| 6,118,890 | A | | 9/2000 | Senior ......................... 382/125 |
| 6,134,340 | A | | 10/2000 | Hsu et al. ..................... 382/124 |
| 6,195,447 | B1 | * | 2/2001 | Ross ........................... 382/125 |
| 6,241,288 | B1 | | 6/2001 | Bergenek et al. ............. 283/67 |
| 6,289,114 | B1 | | 9/2001 | Mainguet ..................... 382/124 |
| 6,327,376 | B1 | | 12/2001 | Harkin ........................ 382/124 |
| 6,483,929 | B1 | | 11/2002 | Murakami et al. ........... 382/115 |
| 6,546,122 | B1 | | 4/2003 | Russo ......................... 382/125 |
| 6,560,352 | B2 | | 5/2003 | Rowe et al. .................. 382/115 |

(Continued)

OTHER PUBLICATIONS

Fang, Generative Models for Fingerprint Individuality using Ridge Types, 2007, IEEE: Third International Symposium on Information Assurance and Security.*

(Continued)

*Primary Examiner*—Matthew C Bella
*Assistant Examiner*—Alex Liew
(74) *Attorney, Agent, or Firm*—Allen, Dyer, Dopplet, Milbrath & Gilchrist, P.A. Attorneys at Law

(57) ABSTRACT

A method for finger biometric processing may include selecting at least one enrollment spot from finger biometric enrollment data comprising a plurality of pixels, and selecting at least one verification spot from finger biometric verification data comprising a plurality of pixels. One or more spot properties is determined for one (or both) of the at least one enrollment spot and the at least one verification spot. The method may further include comparing the at least one enrollment spot with the at least one verification spot based upon a function of corresponding pixel values of the at least one enrollment spot and the at least one verification spot, and also based upon the at least one spot property.

41 Claims, 4 Drawing Sheets

INPUT IMAGE

HIGH - CONTENT SPOT

U.S. PATENT DOCUMENTS

| | | | | |
|---|---|---|---|---|
| 7,006,673 | B2 * | 2/2006 | Hamid | 382/124 |
| 7,197,168 | B2 * | 3/2007 | Russo | 382/125 |
| 2002/0067845 | A1 | 6/2002 | Griffis | 382/107 |
| 2002/0138768 | A1 | 9/2002 | Murakami et al. | 713/202 |
| 2003/0123714 | A1 | 7/2003 | O'Gorman et al. | 382/124 |
| 2003/0126448 | A1 | 7/2003 | Russo | 713/186 |
| 2003/0169910 | A1 | 9/2003 | Reisman et al. | 382/124 |
| 2004/0062425 | A1 * | 4/2004 | Uchida | 382/124 |
| 2004/0062426 | A1 * | 4/2004 | Lo | 382/124 |
| 2004/0179719 | A1 * | 9/2004 | Chen et al. | 382/118 |

OTHER PUBLICATIONS

Chen, The Statistical Modeling of Fingerprint Minutiae Distribution with Implication for Fingerprint Individuality Studies 2008, IEEE.*

Bazen et al., *A Correlation-Based Fingerprint Verification System*, IEEE, ISBN: 90-73461-24-3, STW-2000 09 26-02:35, Nov. 30, 2000-Dec. 1, 2000, p. 205-213.

Kovacs-Vanja, *A Fingerprint Verification System Based on Triangular Matching and Dynamic Time Warping*, IEEE, vol. 22, No. 11, Nov. 2000, pp. 1266-1276.

Coetzee et al., *Fingerprint Recognition in Low Quality Images*, Pattern Recognition, vol. 26, No. 10, pp. 1441-1460, 1993.

Halici et al., *Fingerprint Classification through Self-Organizing Feature Maps Modified to Treat Uncertainties*, Proceedings of the IEEE, vol. 84, No. 10, pp. 1497-1512, Oct. 1996.

Cappelli et al., *Fingerprint Classification by Directional Image Partitioning*, IEEE, vol. 21, No. 5, pp. 402-421, May 1999.

Hong et al., *Fingerprint Image Enhancement: Algorithm and Performance Evaluation*, IEEE, vol. 20, No. 8, pp. 777-789, Aug. 1998.

O'Gorman et al., *An Approach to Fingerprint Filter Design*, Pattern Recognition, vol. 22, No. 1, pp. 29-38, 1989.

Brown, *A Survey of Image Registration Techniques*, Department of Computer Science, Columbia University, ACM Computing Surveys, vol. 24, No. 4, Dec. 1992.

Jain et al., *Fingerprinting Mosaicking*, 2002 IEEE, pp. 4064-4067.

Maltoni et al., *Handbook of Fingerprint Recognition*, Section 2.5, Touch Versus Sweep, pp. 65-69, Springer-Verlag, New York, 2003.

* cited by examiner

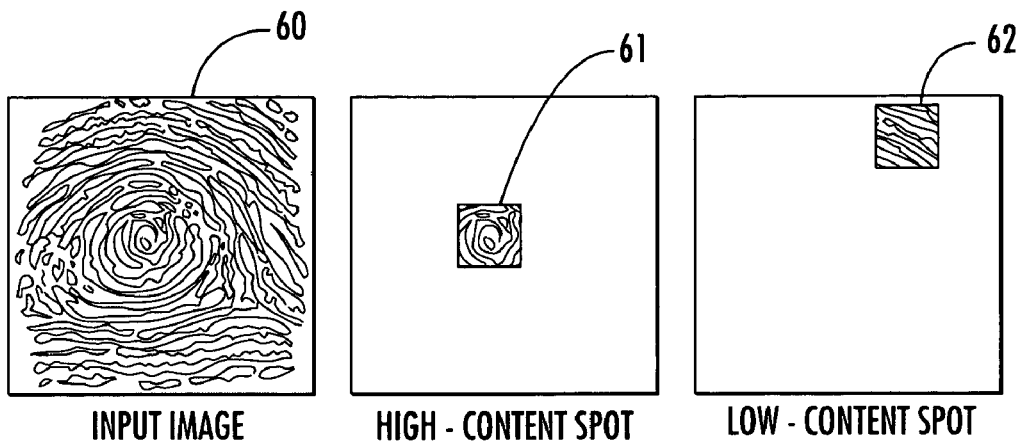
INPUT IMAGE — FIG. 4A
HIGH - CONTENT SPOT — FIG. 4B
LOW - CONTENT SPOT — FIG. 4C
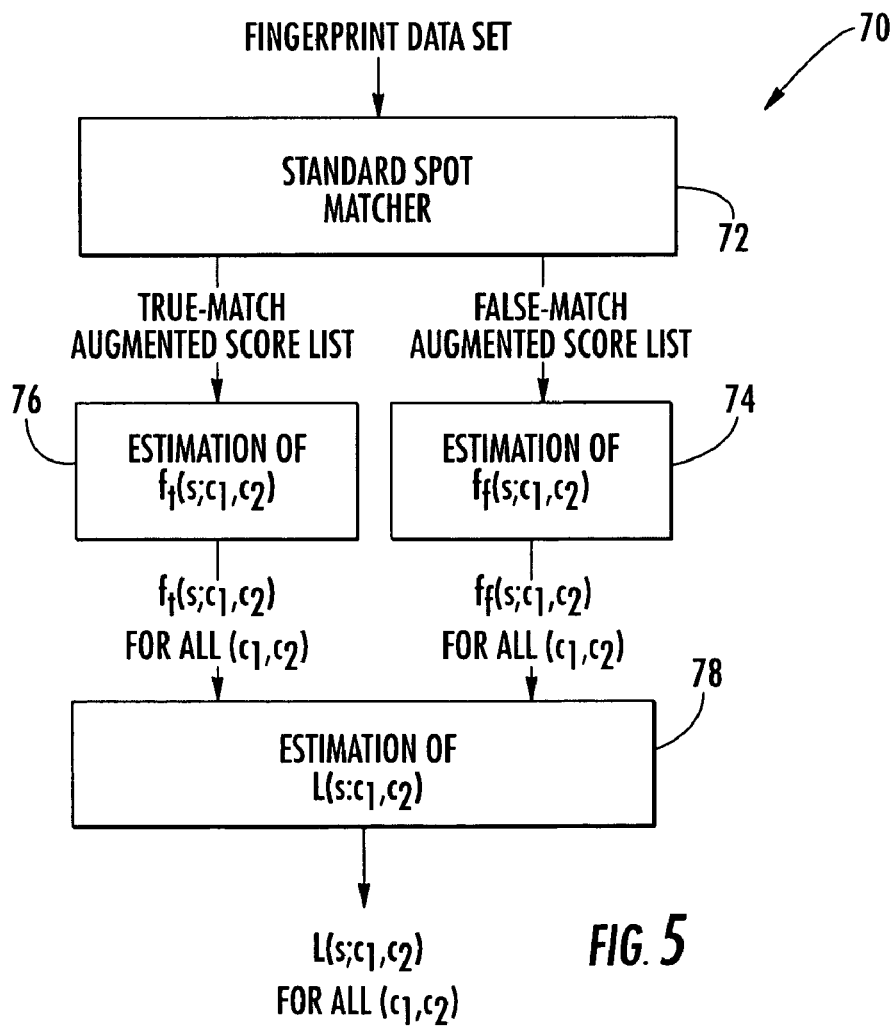
FIG. 5

SPOT-BASED FINGER BIOMETRIC PROCESSING METHOD AND ASSOCIATED SENSOR

RELATED APPLICATION

This application is based upon prior filed co-pending provisional application Ser. No. 60/507,788 filed Oct. 1, 2003, the entire subject matter of which is incorporated herein by reference in their entirety.

FIELD OF THE INVENTION

The present invention relates to the field of biometrics and, more particularly, to a finger biometric processing method and related sensor.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference or enrolled fingerprints already in a database to determine proper identification of a person, such as for verification purposes.

A significant advance in the area of fingerprint sensing is disclosed in U.S. Pat. No. 5,940,526 to Setlak et al. and assigned to the assignee of the present invention. The patent discloses an integrated circuit fingerprint sensor including an array of RF sensing electrodes to provide an accurate image of the fingerprint friction ridges and valleys. More particularly, the RF sensing permits imaging of live tissue just below the surface of the skin to reduce spoofing, for example. The entire contents of the Setlak et al. patent are incorporated herein by reference.

Fingerprint matching approaches can be generally classified into two classes: minutia-based and pattern-based. Minutia-based approaches rely on minutia features, such as ridge ends and bifurcations. On the other hand, pattern-based approaches rely on fingerprint patterns such as image pixel values, ridge orientation and ridge frequency. Pattern-based approaches may be superior to minutia-based approaches when having images of poor quality or when using a small sensor.

A common pattern-based approach relies on image sub-regions, referred to as spots. In this approach, a number of spots are extracted from a fingerprint image used for enrollment. Each spot is then correlated with a fingerprint image used for authentication or verification. This process generates a best correlation score along with the transformation that the given spot undergoes to generate the best score.

The spot transformation includes a two-dimensional translation and possibly a rotation. The final matching score is a function of both the individual correlation scores, for all spots, and the geometric consistency information among spot transformations. Examples of this approach are disclosed in A. M. Bazen, G. T. B. Verwaaijen, S. H. Gerez, L. P. J. Veelenturf and B. J. van der Zwaag, A correlation-based fingerprint verification system, Proc. Workshop on Circuits, Systems and Signal Processing, Veldhoven, The Netherlands, 2000; Z. M. Kovacs-Vajna, A fingerprint verification system based on triangular matching and dynamic time warping, IEEE Transactions of Pattern Analysis and Machine Intelligence, vol. 22, no. 11, November 2000; U.S. Pat. No. 6,241,288 to Bergenek et al.; U.S. Pat. No. 6,134,340 to Hsu et al.; and U.S. Pat. No. 5,067,162 to Driscoll, Jr. et al. The entire discloses of each of these references being incorporated herein by reference.

In another potential scenario, the alignment between the enrollment and verify fingerprints is determined using a fast matcher (e.g., one that uses minutiae or ridge orientation). The alignment is further verified using spots correlated with the match fingerprint image within a small acceptable transformation subspace centered at the transformation provided by the initial matcher. In this case, the overall spot-based score is a function of all individual correlation scores. The overall spot-based score is further combined with the score generated by the first matcher to generate a final matching score. The latter approach is expected to have a superior performance to the former one since it uses more information. In addition, it is also expected to be more efficient since it avoids the exhaustive correlation of each spot against the match fingerprint image.

Despite continued developments in finger biometric matching using spots, such may still not provide accurate matching and while being readily implemented.

SUMMARY OF THE INVENTION

In view of the foregoing background, it is therefore an object of the present invention to provide a finger biometric processing method that is reliable and readily implemented in a finger biometric sensor.

This and other objects, features and advantages in accordance with the present invention are provided by a method for finger biometric processing that may include selecting at least one enrollment spot from finger biometric enrollment data comprising a plurality of pixels, and selecting at least one verification spot from finger biometric verification data comprising a plurality of pixels. Further, one or more spot properties may be determined for one (or both) of the at least one enrollment spot and the at least one verification spot. The method may further include comparing the at least one enrollment spot with the at least one verification spot based upon a function of corresponding pixel values of the at least one enrollment spot and the at least one verification spot, and also based upon the at least one spot property. By way of example, the spot properties may include uncertainty and information content.

More particularly, the selection of the at least one enrollment spot may include generating information content data from the finger biometric enrollment data, and selecting the at least one enrollment spot from the finger biometric enrollment data based upon the information content data. The finger biometric data may comprise finger ridge data, and generating the information content data may comprise generating curvature data based upon finger ridge data.

The method may also include determining at least one peak in the curvature data so that the selecting may comprise selecting based upon the at least one peak in the curvature data. More particularly, the selecting may comprise iteratively selecting a sequence of enrollment spots. Forbidden regions may be defined surrounding the enrollment spots based upon the curvature information data, and subsequent enrollment spots may be selected based upon the forbidden regions surrounding prior enrollment spots. For example, each forbidden region may be defined by a binary function or a penalty function.

The method may further include generating probability distribution functions for at least one of true matches and false matches during an enrollment learning phase. In addition, a family of scoring functions may be generated and used in the comparing based upon the probability distribution functions. The family of scoring functions may be based upon a conditional false acceptance rate, or a conditional likelihood ratio, for example.

Selecting the at least one enrollment spot may comprise selecting a plurality of enrollment spots, and, similarly, selecting the at least one verification spot may comprise generating a plurality of verification spots. The finger biometric enrollment data may comprise finger biometric enrollment pattern data or finger biometric enrollment minutia data.

The method may be implemented using either a finger biometric touch integrated circuit sensor or a finger biometric slide integrated circuit sensor, for example. Accordingly, another aspect of the invention relates to a finger biometric sensor. The sensor may include a finger biometric sensing area, and a processor connected thereto for performing the method steps recited above.

BRIEF DESCRIPTION OF THE DRAWINGS

FIGS. 4A-4C are schematic diagrams of a fingerprint image during processing thereof by the method as shown in FIG. 1.

FIG. 5 is a more detailed flowchart of method steps in accordance with the invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
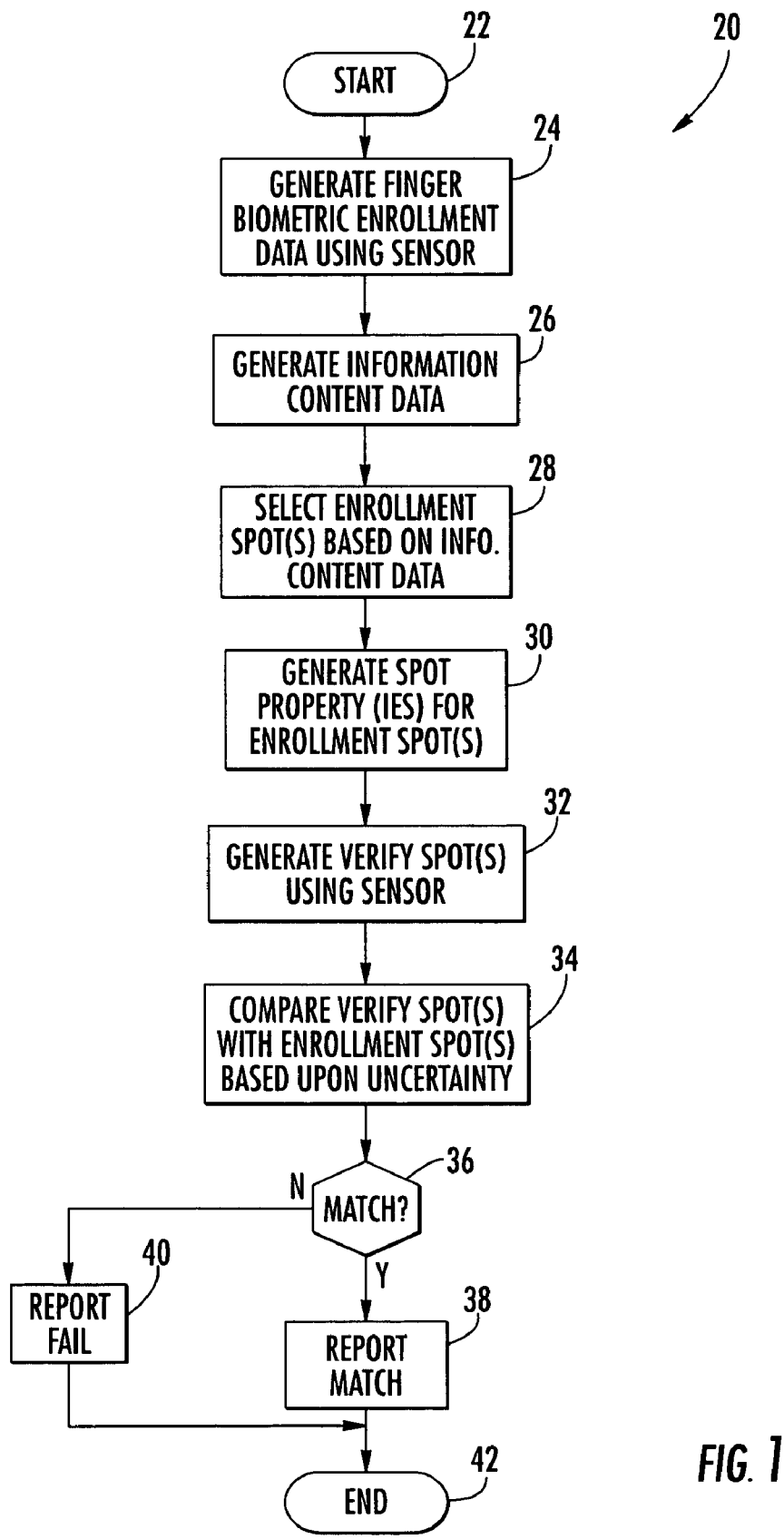
FIG. 1 is a flowchart illustrating method steps in accordance with the present invention.

Referring initially to the flowchart 20 of FIG. 1, basic method aspects of the invention are first described. From the start (Block 22), the method includes generating finger biometric enrollment data (Block 24), and generating information content data from finger biometric enrollment data, at Block 26, as will be described in greater detail below. At Block 28, the method includes selecting at least one enrollment spot from the finger biometric enrollment data based upon the information content data. Again, exemplary selection approaches are described in greater detail below.

At Block 30 one or more spot properties is generated for the at least one enrollment spot, as described in greater detail below. The method may also include generating at least one verification spot from finger biometric verification data (Block 32) as may be generated using a finger biometric sensor. The method may also include comparing the at least one enrollment spot with the at least one verification spot based upon the uncertainty (Block 34). If a match is found at Block 36 a match is reported at Block 38 before ending (Block 42). If no match is found at Block 36, then a match fail is reported at Block 40. The method in accordance with the invention focuses on improving the performance of individual spot correlation and also provides an improved approach for the selection of spots as will be appreciated by those skilled in the art.

The finger biometric data may comprise finger ridge data, for example. Accordingly, in some embodiments, generating the information content data may comprise generating curvature data based upon finger ridge data. The method may also include determining at least one peak in the curvature data so that the selecting may comprise selecting based upon the at least one peak in the curvature data. More particularly, the selecting may comprise iteratively selecting a sequence of enrollment spots. Forbidden regions may be defined surrounding the enrollment spots based upon the curvature information data, and subsequent enrollment spots may be selected based upon the forbidden regions surrounding prior enrollment spots. For example, each forbidden region is defined by a binary function or a penalty function. The selection is also described in greater detail below.

Probability distribution functions may be generated for at least one of true matches and false matches during an enrollment learning phase. Additionally, a family of scoring functions may be generated and used in the comparing based upon the probability distribution functions. The family of scoring functions may be based upon a conditional false acceptance rate, or a conditional likelihood ratio, for example.

Spot uncertainty is an estimate of the noise in the spot data. Estimating spot uncertainty can be done in a variety of ways. One potential approach is to estimate the uncertainty of the ridge orientation data in the region occupied by the spot. The ridge orientation uncertainty can be estimated by smoothing the data and calculating the variance of the differences between original and smoothed data elements. If it is reasonable to assume that the ridge-orientation uncertainty does not change significantly across the fingerprint data, then the uncertainty can be estimated for the whole fingerprint data set and subsequently assigned to each spot extracted from the data.

Selecting may comprise selecting a plurality of enrollment spots, and, similarly, generating the at least one verification spot may comprise generating a plurality of verification spots. The finger biometric enrollment data may comprise finger biometric enrollment pattern data or finger biometric enrollment minutia data.

Figure 2:
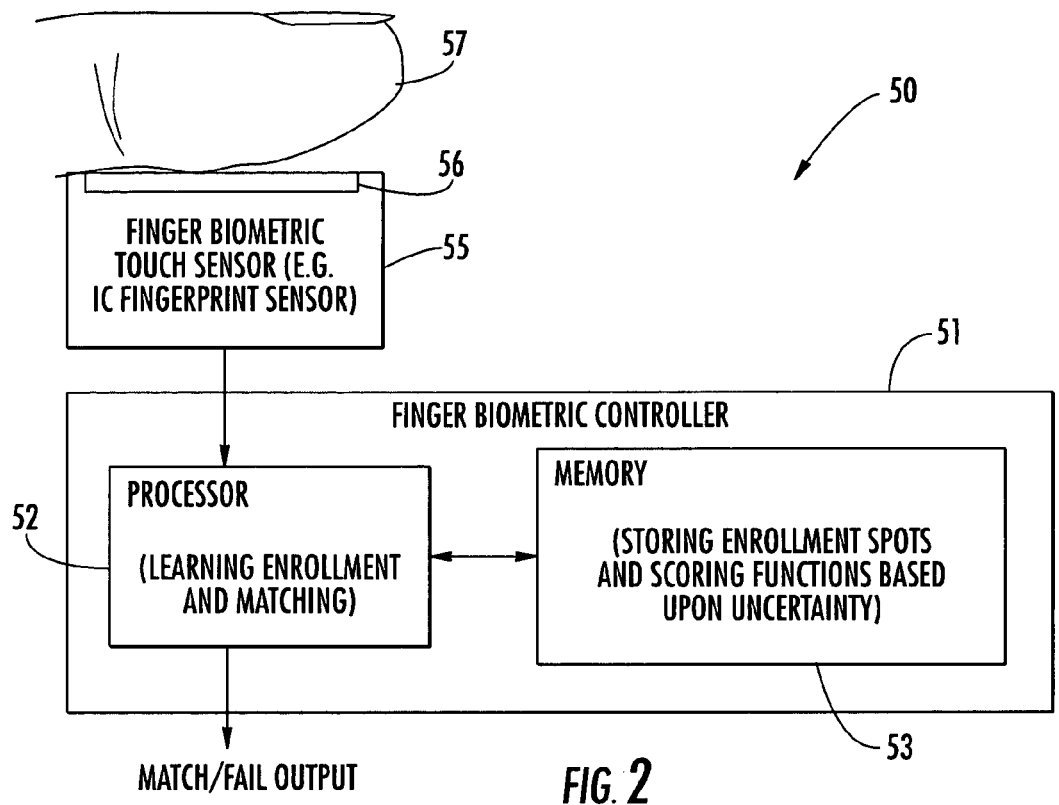
FIG. 2 is a schematic block diagram of an embodiment of a finger biometric sensor implementing the method as shown in the flowchart of FIG. 1.
Figure 3:
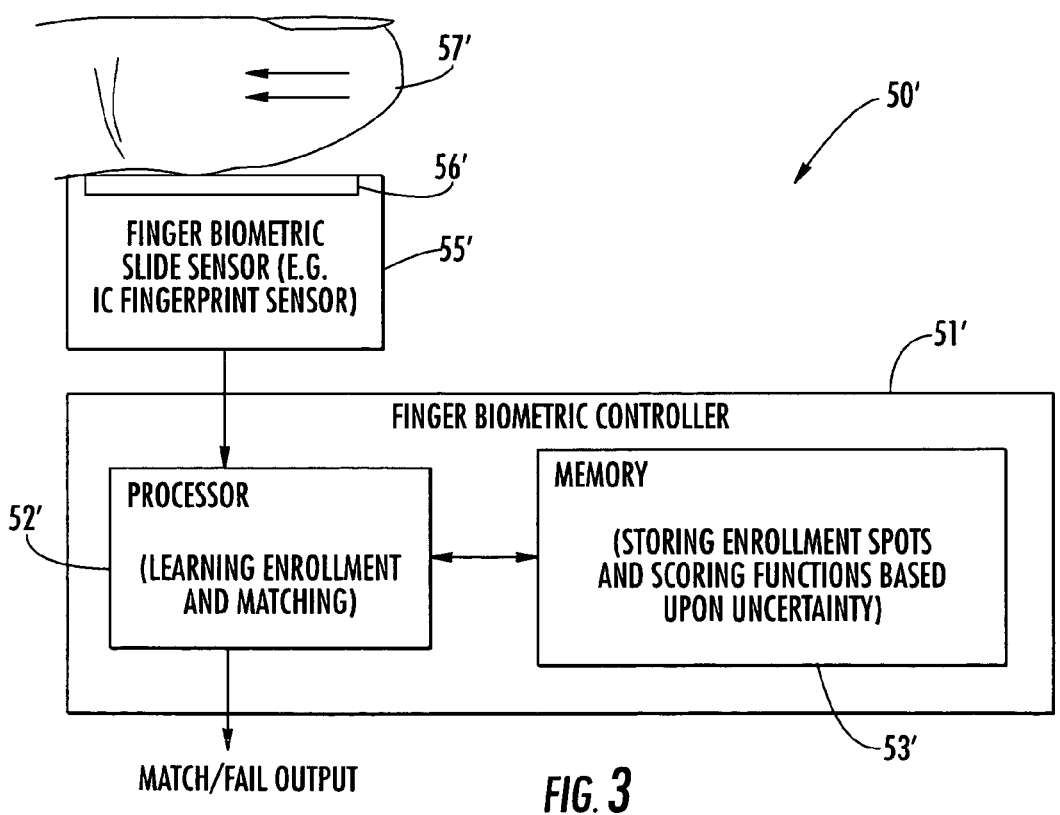
FIG. 3 is a schematic block diagram of another embodiment of a finger biometric sensor implementing the method as shown in the flowchart of FIG. 1.

The method may be implemented using either a finger biometric touch integrated circuit sensor or a finger biometric slide integrated circuit sensor, for example, as now described with additional reference to FIGS. 2 and 3. With particular reference to FIG. 2, the basic finger biometric sensor 50 for performing the method outlined in the flowchart 20 of FIG. 1 is now described. The finger biometric sensor 50 illustratively includes a finger biometric sensing area 56 that is part of an integrated circuit fingerprint sensor 55, for example. The integrated circuit fingerprint sensor 55 may of the RF or electric field sensing type as described in the above noted U.S. Pat. No. 5,940,526 to Setlak et al. Of course, other finger biometric sensors may also be used as will be appreciated by those skilled in the art.

The finger biometric sensor 50 also illustratively includes a finger biometric controller 51 that may reside as separate circuitry or may be included on the integrated circuit substrate that also supports the finger biometric sensing area 56. The controller 51 includes a processor 52 connected to the finger sensing area 56.

The processor 52 may be enterable into a learning enrollment mode to store at least one enrollment spot in the illustrated memory 53. The at least one enrollment spot may be selected as described herein and have one or more spot properties associated therewith. The processor 52 may also perform the verifying or matching of a user versus an enrolled user by generating or collecting at least verify spot and comparing it to the at least one enrollment spot. The processor 52 may be implemented by a microprocessor operating under stored program control, for example, as will be appreciated by those skilled in the art.

The finger biometric sensor 50' shown in FIG. 3 is similar to the sensor 50 of FIG. 2. In this embodiment the integrated circuit fingerprint sensor 55' is a slide sensor with a typically smaller sensing area 56' as will be appreciated by those skilled in the art. Successive image slices may be processed to obtain the at least one enrollment spot and verification spot as will also be appreciated by those skilled in the art without further discussion herein. Those elements indicated with prime notation are similar to the elements described above with reference to FIG. 2 and require no further discussion herein.

Improving the performance of individual spot correlation will now be described in further detail. Existing spot-based matchers typically rely on standard correlation criteria involving pixel-by-pixel comparisons. Each pixel-level comparison generates a similarity or a difference number, which is accumulated for all pixels to generate the final correlation score. This score is proportional to the similarity between the spot and the corresponding area in the match image. Examples of these criteria are the sum of square differences (SSD) and cross-correlation.

A fundamental limitation of these criteria is that they capture only the raw difference between corresponding pixel values. They do not explicitly take into account spot properties that contribute to the raw pixel differences. Below, are outlined some of these properties along with their impact on the correlation score:

A. Pixel Uncertainty (Noise): Let $s_t$ and $s_f$ denote best correlation scores obtained from true and false matches, respectively (normally, $s_t > s_f$). Intuitively, we expect $s_t$ to be inversely proportional to the amount of pixel uncertainty. It can be further shown that $s_f$ is also inversely proportional to pixel uncertainty, a claim that has been verified empirically. Now, consider two cases involving low and high levels of uncertainty. Assume that these cases generate scores $s_{lt}$ ($s_{lf}$) and $s_{ht}$ ($s_{hf}$) for true (false) matches, respectively. Since correlation scores are inversely proportional to uncertainty, assume that $s_{lf} = s_{ht}$. This means that a true-match score at high uncertainty is given the same weight as a false-match score at low uncertainty, which is clearly undesirable. However, if the uncertainty is explicitly taken into account, one can give more weight to the true-match score $s_{ht}$ and less weight to the false-match score $s_{lf}$. This gives the scoring criterion more discriminative power, which subsequently leads to superior recognition performance.

B. Information Content: FIG. 4A shows a fingerprint image 60, while FIGS. 4B and 4C show two spots 61, 62 extracted from it in accordance with the invention. It can be seen that the spot 61 (FIG. 4B) extracted from the core area of the image 60 (FIG. 4A) has more information content (more unique), i.e., a higher quantity of biometric information, than the other spot 62 (FIG. 4C), which is extracted from the upper right area. However, when using a standard scoring criterion, it does not explicitly take this observation into account. Let $s_{1t}$ and $s_{2t}$ be the true-match correlation scores obtained using the high- and low-content spots, respectively. It is reasonable to expect that $s_{1t} = s_{2t}$. However, intuitively, $s_{1t}$ is more "valuable" than $s_{2t}$ since it is obtained from a more unique spot. Accordingly, $s_{1t}$ should be weighted more than $s_{2t}$. A scoring criterion that explicitly accounts for spot information content would be expected to have more discriminative power than a standard criterion.

Next addressed is a scoring criterion based on spot properties. In other words now described is a statistical scoring criterion that explicitly takes spot properties into account. The new property-based scoring criterion improves on the standard one by utilizing information provided by a set of N spot properties, $C = \{C_i\}$. The following discussion assumes that there are only two properties, i.e., N=2 and $C = \{C_1, C_2\}$., where $C_1$ and $C_2$ refer to pixel uncertainty and information content noted above. Extending the discussion to a general value of N is straightforward. The spot properties may also correspond to that of the verification spot, instead of the enrollment spot, or both enrollment and verification spots (e.g., combined uncertainty).

The property-based scoring criterion depends on the conditional probability distribution functions (PDFs) of the selected standard scores given specific values for $C_1$ and $C_2$, denoted by $c_1$ and $c_2$, respectively. We are interested in the conditional score PDFs for both true-matches and false-matches. These conditional PDFs are denoted by $f_t(s; c_1, c_2)$ and $f_f(s; c_1, c_2)$, where $f_t(s; c_1, c_2) = P(S=s|c_1, c_2, H)$, $f_f(s; c_1, c_2) = P(S=s|c_1, c_2, \text{not } H)$ and H is a true-match hypothesis. The new criterion maps the standard score to a probabilistic measure, denoted by $L(s; c_1, c_2)$, which depends on the spot properties. One possible measure is the negative log of conditional false acceptance rate defined as $L(s; c_1, c_2) = -\log \text{FAR}(s; c_1, c_2) = -\log P(S>s|c_1, c_2, \text{not } H)$. Another possibility is the log of conditional likelihood ratio defined as $L(s; c_1, c_2) = \log f_t(s; c_1, c_2) - \log f_f(s; c_1, c_2)$.

The scoring criterion described above requires learning of a function $L(s; c_1, c_2)$ for each selected sample of $(c_1, c_2)$. A flowchart 70 of the learning process is described with reference to FIG. 5. First, a large set of fingerprint images is selected to produce the fingerprint data set. This set is passed to a spot-based matcher 72, that cross matches the images in the set using a selected standard scoring criterion. For each generated best correlation score, s, corresponding spot properties $c_1$ and $c_2$ are estimated at Block 72. The set of three-tuples $\{(s, c_1, c_2)\}$ obtained from all matches are grouped into two lists, referred to as augmented score lists, corresponding to true-matches and false-matches.

The augmented score lists are used to construct the conditional PDFs $f_t(s; c_1, c_2)$, and $f_f(s; c_1, c_2)$ for all sampled values of $(c_1, c_2)$ (Blocks 74, 76). These PDFs are then used to construct at Block 78 a family of scoring functions $L(s; c_1, c_2)$ for all sampled values of $(c_1, c_2)$.

The scoring criterion described above involves a two-dimensional family of scoring functions. This requires a significant amount of fingerprint data for reliable learning. More importantly, it requires a considerable amount of memory space. A more simplified approach can be obtained if the spot properties $C_1$ and $C_2$ are reasonably independent. This assumption significantly simplifies the implementation of the property-based scoring criterion, as it would require learning two one-dimensional families of scoring functions, instead of one two-dimensional family of functions. This simplification is demonstrated for the case when $L(s; c_1, c_2) = -\log \text{FAR}(s; c_1, c_2)$. Other cases can be demonstrated in a similar fashion.

If $C_1$ and $C_2$ are independent, then by applying a series of statistical derivations, one arrives at $L(s; c_1,c_2)=-\log FAR(s; c_1)-\log FAR(s; c_2)+\log FAR(s)$, or equivalently $L(s; c_1,c_2)=L(s; c_1)+L(s; c_2)-L(s)$. Thus, to learn $L(s; c_1,c_2)$, it is sufficient to learn, and subsequently store, two one-dimensional families of functions, $L(s; c_1)$ and $L(s; c_2)$, in addition to a single function $L(s)$.

The above discussion has focused on a scoring criterion involving a single spot. However, typically a number of spots are used in matching. One way of obtaining the overall property-based score is to sum the individual scores of only subset of spots that are geometrically consistent. The summation process implicitly assumes that the individual scores are independent. However, this assumption is not entirely accurate. For example, ridge-frequency information does not change much across the image. Accordingly, the probability that a given spot will generate a good score is higher, if a previous spot has already generated a high score, and vice versa. In addition, scores generated by spatially adjacent spots tend to have some degree of dependency as well. One way of accounting for score dependency is to sort the scores in descending order and attenuating those beyond the first one before the summation.

Now described is a spot-selection scheme based on information content during the enrollment stage. There are a number of desirable objectives in any spot-selection scheme. These objectives include:

1. The spots are rich in information content.
2. Their locations provide a good spatial coverage of the fingerprint area.
3. The spots are as independent as possible from each other. That is, the correlation scores that they generate are as independent as possible.

Note that there may be a conflict between the first objective and the other ones. This is because the first objective tends to favor spots that are clustered in information-rich areas (e.g., the core). On the other hand, the second and third objectives call for spots that are far apart from each other. These conflicting objectives can be balanced using the following spot-selection scheme.

First, an information-content function, $I(x,y)$, is defined over the fingerprint image. The value of this function at location $(x,y)$ is an estimate of the information content of the spot centered at the same location. This function can be defined in several ways. One embodiment uses curvature information derived from ridge-orientation map, where the value of $I(x,y)$ is the average curvature of a spot at location $(x,y)$. Spots are selected in an iterative fashion by looking for peaks in $I(x,y)$. Notice that peaks correspond to locations that are richer in content than neighboring ones.

In the first iteration, the scheme selects the location of the highest peak in $I(x,y)$ as that of the first spot. A "forbidden" region is then defined about the chosen location. Locations of subsequent spots are restricted to lie outside this region. The size of the forbidden region is made inversely proportional to the height of the chosen peak. Thus, spots of higher information content can be spatially adjacent to each other, whereas spots of lower information content have to be spread apart. Note that the forbidden region has a minimum size, which prevents spots from being spatially overlapping. The spot-selection scheme continues in a similar fashion by selecting the highest location outside previously defined forbidden regions, and then defining a forbidden region for the newly selected spot. It terminates when the desired number of spots is obtained, or when no further spots can be found.

Figure 6:
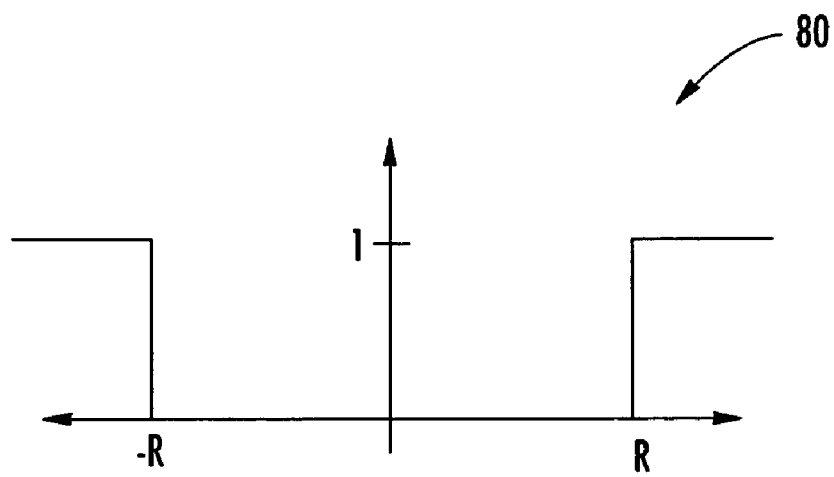
FIG. 6 is a plot of a binary function defining a forbidden region in accordance with the present invention.
Figure 7:
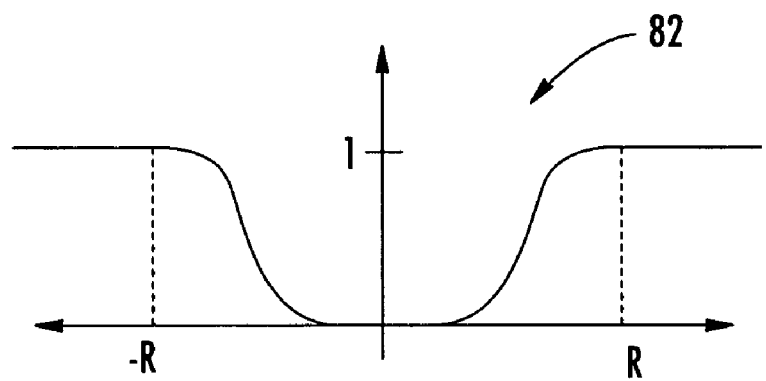
FIG. 7 is a plot of a penalty function defining a forbidden region in accordance with the present invention.

An alternative to the forbidden region as described above can be outlined as follows. The forbidden region can be viewed as "zeroing out" values in $I(x,y)$ that fall within it, or equivalently multiplying them by zero. Thus, it can be represented as a binary function, whose values are zero inside the region and one otherwise. One possible generalization is to replace the forbidden region by a "penalty" function centered at the chosen spot location. This function is used to attenuate appropriate values in $I(x,y)$ through multiplication. The values of the penalty function are zero in an area about the selected spot location, to prevent spot overlap, and then they gradually increase until they reach one, which means that corresponding values of $I(x,y)$ will be unaffected. FIG. 6 shows a one-dimensional cross sectional plot 80 depicting a circular forbidden region and FIG. 7 shows a corresponding penalty function plot 82.

Those of skill in the art will recognize that two significant advancements in finger biometric processing are disclosed herein and may advantageously be combined in some embodiments. In yet other embodiments, these advancements may be used individually.

Additional features of the invention may be found in co-pending applications entitled METHODS FOR FINGER BIOMETRIC PROCESSING AND ASSOCIATED FINGER BIOMETRIC SENSORS, 10/956,491; and METHODS FOR MATCHING RIDGE ORIENTATION CHARACTERISTIC MAPS AND ASSOCIATED FINGER BIOMETRIC SENSOR, 10/957,335, the entire disclosures of which are hereby incorporated herein by reference.

Accordingly, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for finger biometric processing comprising:
sensing finger biometric verification data comprising a plurality of pixels using a finger biometric sensor;
iteratively selecting, using a processor, a sequence of enrollment spots from finger biometric enrollment data comprising a plurality of pixels representing finger ridge data;
selecting, using the processor, at least one verification spot from the finger biometric verification data comprising a plurality of pixels by
  generating information content data from the finger biometric enrollment data by generating curvature data based upon the finger ridge data,
  determining at least one peak in the curvature data, and
  selecting the at least one enrollment spot from the finger biometric enrollment data based upon the at least one peak in the curvature data;
determining, using the processor, at least one spot property for at least one of the sequence enrollment spots and the at least one verification spot;
comparing, using the processor, at least one of the sequence of enrollment spots with the at least one verification spot based upon a function of corresponding pixel values of at least one of the sequence of enrollment spots and the at least one verification spot, and also based upon the at least one spot property;
defining, using the processor, forbidden regions surrounding the sequence of enrollment spots based upon the curvature data; and selecting, using the processor, subsequent enrollment spots based upon the forbidden regions surrounding prior enrollment spots.

2. A method according to claim 1 wherein each forbidden region is defined by a binary function.

3. A method according to claim 1 wherein each forbidden region is defined by a penalty function.

4. A method according to claim 1 wherein the at least one spot property comprises information content data.

5. A method according to claim 1 wherein determining the at least one spot property comprises determining an uncertainty associated with at least one of the at least one enrollment spot and the at least one verification spot.

6. A method according to claim 1 further comprising generating probability distribution functions for at least one of true matches and false matches during an enrollment learning phase; and wherein the comparison is based upon the probability distribution functions.

7. A method according to claim 6 further comprising generating a family of scoring functions to be used in the comparing based upon the probability distribution functions for at least one of true matches and false matches.

8. A method according to claim 7 wherein the family of scoring functions are based upon a conditional false acceptance rate.

9. A method according to claim 6 wherein the family of scoring functions are based upon a conditional likelihood ratio.

10. A method according to claim 1 wherein selecting the at least one enrollment spot comprises selecting a plurality of enrollment spots; and wherein selecting the at least one verification spot comprises selecting a plurality of verification spots.

11. A method according to claim 1 wherein the finger biometric enrollment data comprises at least one of finger biometric enrollment pattern data and finger biometric enrollment minutia data.

12. A method according to claim 1 further comprising generating the finger biometric enrollment data using at least one of a finger biometric touch integrated circuit sensor and a finger biometric slide integrated circuit sensor.

13. A method for finger biometric processing comprising:
sensing finger ridge data using a finger biometric sensor;
generating, using a processor, probability distribution functions for at least one of true matches and false matches during an enrollment learning phase;
generating, using the processor, finger ridge curvature data from the finger ridge data;
determining, using the processor, at least one peak in the finger ridge curvature data;
selecting, using the processor, at least one enrollment spot from the finger ridge data based upon the at least one peak in the finger ridge curvature data;
generating, using the processor, at least one verification spot from finger biometric verification data; and
comparing, using the processor, the at least one enrollment spot with the at least one verification spot to determine a match therewith, the comparison being based upon the probability distribution functions.

14. A method according to claim 13 wherein selecting comprises iteratively selecting a sequence of enrollment spots; wherein forbidden regions are defined surrounding the finger biometric spots based upon the finger ridge curvature data; and wherein subsequent enrollment spots are selected based upon the forbidden regions surrounding prior enrollment spots.

15. A method according to claim 14 wherein each forbidden region is defined by at least one of a binary function and a penalty function.

16. A method according to claim 13 further comprising generating an uncertainty for the at least one enrollment spot; and wherein comparing comprises comparing based upon the uncertainty.

17. A method according to claim 13 further comprising determining information content data for the at least one enrollment spot; and wherein comparing comprises comparing based upon the information content data.

18. A method according to claim 13 further comprising generating a family of scoring functions to be used in the comparing based upon the probability distribution functions for at least one of true matches and false matches.

19. A method for finger biometric processing comprising:
sensing finger biometric verification data using a finger biometric sensor;
selecting, using a processor, at least one enrollment spot from the finger biometric enrollment data, each enrollment spot having a plurality of spot properties;
generating, using the processor, scoring information for the spot properties of the at least one enrollment spot by
generating probability distribution functions for at least one of true matches and false matches during an enrollment learning phase, and
generating a family of scoring functions based upon the probability distribution functions for at least one of true matches and false matches;
generating, using the processor, at least one verification spot from the finger biometric verification data; and
comparing, using the processor, the at least one enrollment spot with the at least one verification spot based upon the family of scoring functions to determine a match therewith.

20. A method according to claim 19 wherein the spot properties are independent.

21. A method according to claim 19 wherein the family of scoring functions are based upon a conditional false acceptance rate.

22. A method according to claim 19 wherein the family of scoring functions are based upon a conditional likelihood ratio.

23. A method according to claim 19 further comprising generating information content data from the finger biometric data; and wherein selecting comprises selecting the at least one enrollment spot based upon the information content data.

24. A finger biometric sensor comprising:
a finger biometric sensing area; and
a processor connected to said finger biometric sensing area for
generating finger biometric enrollment data comprising finger ridge data and generating probability distribution functions for at least one of true matches and false matches during an enrollment learning phase,
generating information content data from the finger biometric enrollment data as finger ridge curvature data based upon the finger ridge data,
selecting at least one enrollment spot from the finger biometric enrollment data based upon the information content data,
generating an uncertainty for the at least one enrollment spot,
generating at least one verification spot from finger biometric verification data, and
comparing the at least one enrollment spot with the at least one verification spot based upon the uncertainty and the probability distribution functions to determine a match therewith; and a memory connected to said processor for storing the at least one enrollment spot and uncertainty associated therewith.

25. A finger biometric sensor according to claim 24 wherein said processor further determines at least one peak in the finger ridge curvature data; and wherein said processor selects the at least one enrollment spot based upon the at least one peak in the finger ridge curvature data.

26. A finger biometric sensor according to claim 24 wherein said processor iteratively selects a sequence of enrollment spots, defines forbidden regions surrounding the finger biometric spots based upon the finger ridge curvature data and with subsequent enrollment spots being selected based upon the forbidden regions surrounding prior enrollment spots.

27. A finger biometric sensor according to claim 26 wherein each forbidden region is defined by at least one of a binary function, and a penalty function.

28. A finger biometric sensor according to claim 24 wherein said processor generates the uncertainty based upon a plurality of enrollment spots.

29. A finger biometric sensor according to claim 24 wherein said processor further generates information content data for the at least one enrollment spot, and compares the at least one enrollment spot with the at least one verify spot also based upon the information content data.

30. A finger biometric sensor according to claim 24 wherein said processor further generates a family of scoring functions to be used in the comparing based upon the probability distribution functions for at least one of true matches and false matches.

31. A finger biometric sensor according to claim 24 wherein said finger biometric sensing area comprises one of an integrated circuit touch sensor area and an integrated circuit slide sensor area.

32. A finger biometric sensor comprising:
a finger biometric sensing area; and
a processor connected to said finger biometric sensing area for
generating probability distribution functions for at least one of true matches and false matches during an enrollment learning phase,
generating finger ridge data,
generating finger ridge curvature data from finger ridge data,
determining at least one peak in the finger ridge curvature data,
selecting at least one enrollment spot from the finger ridge data based upon the at least one peak in the finger ridge curvature data,
generating at least one verification spot from finger biometric verification data, and
comparing the at least one enrollment spot with the at least one verification spot to determine a match therewith, the comparison being based on the probability distribution functions.

33. A finger biometric sensor according to claim 32 wherein said processor iteratively selects a sequence of enrollment spots, defines forbidden regions surrounding the finger biometric spots based upon the finger ridge curvature data and with subsequent enrollment spots being selected based upon the forbidden regions surrounding prior enrollment spots.

34. A finger biometric sensor according to claim 33 wherein each forbidden region is defined by at least one of a binary function, and a penalty function.

35. A finger biometric sensor according to claim 33 wherein said processor further generates an uncertainty for the at least one enrollment spot; and wherein said processor compares the at least one enrollment spot with the at least one verification spot based upon the uncertainty.

36. A finger biometric sensor according to claim 32 wherein said processor further generates a family of scoring functions to be used in the comparing based upon the probability distribution functions for at least one of true matches and false matches.

37. A finger biometric sensor comprising:
a finger biometric sensing area; and
a processor connected to said finger biometric sensing area for
generating finger biometric enrollment data,
selecting at least one enrollment spot from finger biometric enrollment data, each enrollment spot having a plurality of spot properties,
generating scoring information for the spot properties of the at least one enrollment spot by generating probability distribution functions for at least one of true matches and false matches during an enrollment learning phase, and generating a family of scoring functions based upon the probability distribution functions for at least one of true matches and false matches,
generating at least one verification spot from finger biometric verification data, and
comparing the at least one enrollment spot with the at least one verification spot based upon the family of scoring functions to determine a match therewith.

38. A finger biometric sensor according to claim 37 wherein the spot properties are independent.

39. A finger biometric sensor according to claim 37 wherein the family of scoring functions are based upon a conditional false acceptance rate.

40. A finger biometric sensor according to claim 37 wherein the family of scoring functions are based upon a conditional likelihood ratio.

41. A finger biometric sensor according to claim 37 wherein said processor generates information content data from the finger biometric data for selecting the at least one enrollment spot based upon the information content data.

* * * * *